United States Patent [19]

Hashimoto et al.

[11] Patent Number: 5,153,053

[45] Date of Patent: Oct. 6, 1992

[54] MAGNETIC RECORDING MEDIUM COMPRISING A LOWER MAGNETIC LAYER CONTAINING AN AMINE MODIFIED VINYL CHLORIDE COPOLYMER AND AN UPPER MAGNETIC LAYER CONTAINING A VINYL CHLORIDE COPOLYMER WITH A POLAR GROUP

[75] Inventors: Hiroshi Hashimoto; Akira Ushimaru; Masatoshi Takahashi, all of Kanagawa, Japan

[73] Assignee: Fuji Photo Film Co., Ltd., Kanagawa, Japan

[21] Appl. No.: 570,755

[22] Filed: Aug. 22, 1990

[30] Foreign Application Priority Data

Aug. 22, 1989 [JP] Japan .................. 1-215617

[51] Int. Cl.⁵ .................................. G11B 5/00
[52] U.S. Cl. ................................ 428/215; 428/323; 428/329; 428/336; 428/402; 428/424.6; 428/425.9; 428/515; 428/518; 428/520; 428/522; 428/694; 428/695; 428/900
[58] Field of Search .............. 427/128; 428/215, 323, 428/336, 329, 402, 424.6, 425.9, 694, 695, 900, 515, 518, 522, 520

[56] References Cited

U.S. PATENT DOCUMENTS

| | | |
|---|---|---|
| 4,506,000 | 3/1985 | Kubota et al. ............ 430/39 |
| 4,784,913 | 11/1987 | Nakamura et al. ........ 428/411.1 |
| 4,844,946 | 5/1989 | Komatsu et al. ......... 427/48 |
| 4,851,289 | 7/1989 | Ogawa ..................... 428/694 |
| 4,865,924 | 9/1989 | Saito et al. ............... 428/694 |
| 4,965,120 | 10/1990 | Ono et al. ................ 428/213 |

FOREIGN PATENT DOCUMENTS 61-172213  8/1986  Japan .

*Primary Examiner*—Paul J. Thibodeau
*Assistant Examiner*—Stevan A. Resan
*Attorney, Agent, or Firm*—Sughrue, Mion, Zinn, Macpeak & Seas

[57] ABSTRACT

A magnetic recording medium excellent in video output and audio output is disclosed which comprises a nonmagnetic support having thereon at least plurality of a first magnetic layer and a second magnetic layer, containing ferromagnetic particles dispersed in a binder, in that sequence, wherein said first magnetic layer contains an amine-modified vinyl chloride copolymer as the binder. Preferably, the second magnetic layer contains a vinyl chloride copolymer as a binder having at least one polar group selected from the group consisting of —OH, an epoxy group, —COOM, —SO$_3$M, —OSO$_3$M,

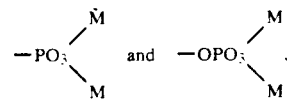

wherein M represents hydrogen, an alkali metal or ammonium.

15 Claims, No Drawings

MAGNETIC RECORDING MEDIUM COMPRISING A LOWER MAGNETIC LAYER CONTAINING AN AMINE MODIFIED VINYL CHLORIDE COPOLYMER AND AN UPPER MAGNETIC LAYER CONTAINING A VINYL CHLORIDE COPOLYMER WITH A POLAR GROUP

FIELD OF THE INVENTION

The present invention relates to a magnetic recording medium having a magnetic layer of a plural-magnetic layer structure, and having excellent properties in video output and audio output.

BACKGROUND OF THE INVENTION

A magnetic recording medium is widely used as recording tapes, audio tapes, floppy disks and the like. The magnetic recording medium basically comprises a non-magnetic support and magnetic layers formed thereon, the magnetic layer containing a ferromagnetic powder dispersed in a binder.

It is necessary that the magnetic recording media have high levels of characteristics such as electromagnetic characteristics, running durability and running properties. Namely, the audio tapes for music reproduction are required to have higher ability to reproduce original sounds. With respect to the video tapes, excellent electromagnetic characteristics are required such as ability to reproduce original images.

It is known that the electromagnetic characteristics of the magnetic recording media containing the ferromagnetic powders vary considerably depending on the quality of the dispersion of the ferromagnetic powders in the magnetic layers. For this reason, even if ferromagnetic powder having excellent magnetic characteristics is used to improve the electromagnetic characteristics, the excellent magnetic characteristics of the ferromagnetic powder are not reflected in improvements of electromagnetic characteristics when the ferromagnetic powder is poorly dispersed.

As a method for improving the quality of the dispersion of the ferromagnetic powders in the magnetic layers, the method of performing dispersion by kneading for an extended period of time such as for numerous hours has been used in producing magnetic coatings for the preparation of the magnetic layers. However, such dispersion by kneading for prolonged periods of time has the drawback in that the magnetic characteristics of the ferromagnetic powders are adversely affected. In addition, the most efficient operation scheme for the production process is deviated from.

Recently, methods have been proposed in which functional groups are introduced in resin components forming binders so as to give good affinity with the ferromagnetic powders to the binders for the magnetic layers.

For example, such methods for the magnetic recording media are described in JP-A-59-5424 (the term "JP-A" as used herein means an "unexamined published Japanese patent application"), JP-A-59-5423, JP-A-59-40320, JP-A-59-8127, JP-A-61-158023, JP-A-63-275022, JP-A-63-268118, JP-A-61-172213, JP-A-62-107434, JP-A-96727 and JP-A-172710, and such the magnetic coating resins are described in JP-A-60-236814, JP-A-60-238309 and JP-A-61-243933.

However, the object of these methods is to obtain a single magnetic layer.

For example, JP-A-61-172213 proposes to use a copolymer comprising vinyl chloride units, vinyl alcohol units and amine-modified vinyl units as essential components of a binder which is excellent in dispersibility and prevents the ferromagnetic powders from aggregating.

When this copolymer is used for the single layer system, a very hard magnetic layer is obtained and its durability is good. However, the copolymer has the disadvantage of causing imperfect contact with a magnetic head. Further, it has the disadvantage in that the proper adhesion with the non-magnetic support can not be obtained.

Prior ar disclosing the magnetic recording media having the plural-magnetic layer structure includes, for example, JP-A-62-31021. The magnetic recording medium described therein comprises a first magnetic layer formed on a non-magnetic support and a second magnetic layer formed on the first magnetic layer. The first magnetic layer has a lower Young's modulus in the thickness direction than the second magnetic layer. In such prior-art magnetic recording media having the plural-magnetic layer structure, the same binder is used in both of the first and second magnetic layers, as shown in Example 1 of JP-A-62-31021. Specifically, the copolymer of vinyl chloride, vinyl acetate and maleic anhydride is used.

A vinyl chloride copolymer, which is a relatively hard binder, has conventionally been used as a main binder and further in combination with a soft polyurethane resin and the like. It has been found that this copolymer greatly affects the characteristics of the magnetic layer. The phenomenon has been observed that the binder in which carboxyl groups or sulfonic acid groups are introduced improves the dispersibility of the ferromagnetic powder, but hardens the film of the magnetic layer if the functional groups are contained in large amounts. Namely, when the binders each having the same amounts of the functional groups are added to the first and second magnetic layers, respectively, the dispersibility of the ferromagnetic powder in both of the first and second layers is improved, but the film becomes too hard. Consequently, the problem of imperfect contact between the magnetic head and second magnetic layer is particularly encountered in the case of such hardened films.

SUMMARY OF THE INVENTION

An object of the present invention is to provide a magnetic recording medium of a plural-magnetic layer structure in which the video output and the audio output are satisfactorily compatible with each other.

The above-described object can be attained by the present invention hereinafter described.

Namely, the present invention is to provide a magnetic recording medium comprising a non-magnetic support having thereon at least plurality of a first magnetic layer and a second magnetic layer, containing ferromagnetic particles dispersed in a binder, in that sequence, wherein said first magnetic layer contains an amine-modified vinyl chloride copolymer as the binder. Even more preferably, the above-described second magnetic layer contains as the binder a vinyl chloride copolymer having at least one polar group selected from the group consisting of —OH, an epoxy group, —COOM, —SO$_3$M, —OSO$_3$M,

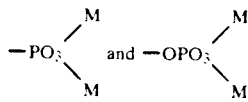

wherein M represents hydrogen, an alkali metal or ammonium).

DETAILED DESCRIPTION OF THE INVENTION

In the present invention, the amine-modified vinyl chloride copolymer binder contained in the above-described first magnetic layer is adsorbed by the ferromagnetic powder in the first magnetic layer (i.e., the lower layer) to improve the dispersibility and the filling property of the ferromagnetic powder.

The amine-modified vinyl chloride copolymer has a catalytic effect of an isocyanate hardening agent, unlike binders including polar groups such as an $SO_3$ group and a $PO_3H_2$ group. Therefore, the amine-modified vinyl chloride copolymer is provided for obtaining uniform surface properties and superior durability of the magnetic layer of the present invention.

Since the first magnetic layer contributes to the audio output, the audio output and the contact with the magnetic head are remarkably improved.

Preferred embodiments of the present invention are as follows:

(1) A magnetic recording medium in which the first (i.e., the lower) and second (i.e., the upper) magnetic layers are applied on the support by simultaneous or successive multiple layer coating methods, and the second magnetic layer (i.e., the upper layer) is applied while the previously applied first magnetic layer is in a wet state.

(2) A magnetic recording medium in which the ferromagnetic powder of the above-described first magnetic layer has a specific surface area of 45 m²/g or less, which is measured by the BET method ($S_{BET}$), and a crystallite size of 290 Å or more; the ferromagnetic powder of the second magnetic layer has a specific surface area of 30 m²/g or more, which is measured by the BET method, and a crystallite size of 400 Å or less; the ferromagnetic powder of the first magnetic layer is lower in specific surface area measured by the BET method than the second magnetic layer; and the difference in specific surface area therebetween is more than 5 m²/g.

(3) A magnetic recording medium in which the above-described first magnetic layer contains polyurethane and polyisocyanate compounds as binders, in addition to the amine-modified vinyl chloride copolymer.

(4) A magnetic recording medium in which the above-described amine-modified vinyl chloride copolymer contains an amine or an ammonium salt in an amount of $5 \times 10^{-6}$ to $1 \times 10^{-3}$ eq per 1 g of the copolymer.

(5) A magnetic recording medium in which the above-described amine-modified vinyl chloride copolymer contains 0.5 to 30% by weight of a vinyl alkyl carboxylate and/or a (meth)acrylate as a comonomer.

(6) A magnetic recording medium in which the above-described amine-modified vinyl chloride copolymer contains —OH groups and/or epoxy groups in an amount of $5 \times 10^{-5}$ to $2 \times 10^{-3}$ eq per 1 g of the copolymer.

(7) A magnetic recording medium in which carbon black contained in the first magnetic layer has an average particle size of less than 20 mµ, and is contained in an amount of 1 to 20 parts by weight per 100 parts by weight of the ferromagnetic powder.

(8) A magnetic recording medium in which carbon black contained in the second magnetic layer has an average particle size of 40 to 80 mµ, and is contained in an amount of 0.1 to 10 parts by weight per 100 parts by weight of the ferromagnetic powder.

(9) A magnetic recording medium in which the thickness of the first magnetic layer is 1.5 to 5.0 µm, and the thickness of the second magnetic layer is 3.5 µm or less.

(10) A magnetic recording medium in which the first magnetic layer contains an abrasive agent having a Mohs' hardness of less than 7, and the second magnetic layer contains an abrasive agent having a Mohs' hardness of 7 or more.

(11) A magnetic recording medium in which the ferromagnetic powder contained in the second magnetic layer has a coercive force (Hc) of 1,000 Oe or more, the ferromagnetic powder contained in the first magnetic layer has an Hc of 600 Oe or more, and the ferromagnetic powders contained in the first and second magnetic layers are cobalt-modified $\gamma$-$FeO_x$ (x is 1.33 to 1.5).

(12) A magnetic recording medium in which the amount of a lubricating agent contained in the second magnetic layer is larger than that contained in the first magnetic layer.

(13) Alternatively, a magnetic recording medium in which a coating solution for the second magnetic layer contains a polyisocyanate compound while a coating solution for the first magnetic layer is free from the polyisocyanate compound, and the second magnetic layer is applied on the first magnetic layer by simultaneous or successive multiple layer coating methods while the first magnetic layer is in a wet state.

The amine-modified vinyl chloride copolymer used in the first magnetic layer of the magnetic recording medium of the present invention is a copolymer which mainly comprises vinyl chloride units and further contains amine-modified vinyl units. The copolymer can further contain other copolymerizable units.

Methods for introduction of the amine-modified vinyl units include a method in which an amine compound is reacted with a vinyl chloride copolymer and a method in which an amine-modified vinyl monomer is copolymerized with vinyl chloride and another monomer(s).

The above-described amine compounds include primary, secondary and tertiary amines such as aliphatic amines, alicyclic amines, alkanolamines and alkoxyalkylamines.

Specific examples of such amines include methylamine, ethylamine, propylamine, butylamine, cyclohexylamine, ethanolamine, naphthylamine, aniline, o-toluidine, dimethylamine, diethylamine, dioctylamine, diisobutylamine, diethanolamine, methylethanolamine, dimethylethanolamine, dibutylethanolamine, methyldiethanolamine, 2-methoxyethylamine, di-2-methoxyethylamine, N-methylaniline, trimethylamine, triethylamine, triisobutylamine, tridecylamine, N-methylbutylamine, N-methylphenylamine, hexamethylenetetramine, triethanolamine, dimetylpropylamine, pyridine, alpha-picoline, beta-picoline, gamma-picoline, 2,4-lutidine, quinoline, morpholine, diaminopropane and hexamethylenediamine.

When directly copolymerized with vinyl chloride, monomers can be used such as acrylates, methacrylates and allyl ethers which have primary, secondary or tertiary aliphatic amino, alicyclic amino or alkanolamino groups, or quaternary ammonium salt groups.

The amount of these amino groups or quaternary ammonium salt groups is preferably $1 \times 10^{-3}$ to $5 \times 10^{-6}$ eq per g of the amine-modified vinyl chloride copolymer, more preferably $2 \times 10^{-4}$ to $1 \times 10^{-5}$ eq per g of the copolymer.

If the amount is either larger or smaller than the above range, the dispersibility and the filling property are deteriorated.

Copolymerization of the other monomers improves the solvent solubility of the copolymers and therefore is preferred. Such other monomers include vinyl carboxylates such as vinyl acetate, vinyl propionate, vinyl laurate and vinyl stearate; alkyl (meth)acrylates such as methyl (meth)acrylate, ethyl (meth)acrylate, propyl (meth)acrylate, n-butyl (meth)acrylate, lauryl (meth)acrylate and stearyl (meth)acrylate; and alkyl allyl ethers. The amount of these monomers is preferably 0.5 to 20% by weight based on the amine-modified vinyl chloride copolymer. If the amount exceeds this range, the mechanical strength of the entire resins is reduced and therefore unfavorable.

When the copolymer in which an OH group-containing monomer or an epoxy group-containing monomer (i.e., as the other monomers) is copolymerized is used with a polyisocyanate compound as a hardening agent, a cross-linking reaction takes place to improve the mechanical strength, which results in an improvement in durability. The OH group-containing monomers include vinyl alcohol, hydroxyalkyl (meth)acrylates, (meth)acrylates of polyalkylene oxides and allyl ethers of polyalkylene oxides, and the epoxy group-containing monomers include glycidyl (meth) acrylate and allylglycidyl ethers.

The amount of these OH groups or epoxy groups is preferably $1.5 \times 10^{-3}$ to $10 \times 10^{-3}$ eq, more preferably $2 \times 10^{-3}$ to $5 \times 10^{-5}$ eq per g of the amine-modified vinyl chloride copolymer. If the amount exceeds the above range, the dispersibility is deteriorated.

In addition, there may be copolymerized vinylidene chloride, styrene, butadiene, acrylonitrile, ethylene, vinyl butyral, vinyl acetal and acrylamide.

Further, introduction of (meth)acryloyl groups and the like as radiation curable functional groups enables application to radiation curable type magnetic layers.

The degree of polymerization of the amine-modified vinyl chloride copolymer is preferably 200 to 600, more preferably 250 to 450. If the polymerization degree exceeds the above range, the viscosity of the coating solutions increases to deteriorate the dispersibility, and if the polymerization degree is below the above range, the mechanical strength is lowered to cause a reduction in durability.

As the amine-modified vinyl chloride copolymers, all of the copolymers can be used as described in JP-A-61-172213, JP-A-62-107434, JP-A-62-257619, JP-A-62-073417, JP-A-63-172710, JP-A-63-0229612, JP-A63-275025, JP-A-63-276708 and JP-A-63-279421.

As the preferred binders used in the second magnetic layer of the magnetic recording medium of the present invention, the vinyl chloride copolymers can be mainly used preferably. Such vinyl chloride copolymers include copolymers having vinyl chloride as a main monomer with vinyl acetate, vinyl alcohol, maleic acid, acrylic acid, acrylates, vinylidene chloride, acrylonitrile, methacrylic acid, methacrylates, styrene, butadiene, ethylene, vinyl butyral, vinyl acetal, vinyl ether, vinylsulfonic acid, acrylamide, hydroxyethyl acrylate, glycidyl acrylate or the like; and copolymers obtained by introducing a polar group(s) therein. The polar groups include -OH, an epoxy group, —COOM, $—SO_3M$, $—OSO_3M$, (in tho above formulae, M represents hydrogen, an alkali metal or ammonium). As these vinyl chloride copolymers, all of the copolymers can be used as described in JP-A-57-44227, JP-A-58-177524, JP-A-59-5423, JP-A-59-40320, JP-A-60-235814, JP-A-62-134819 and JP-A-62-08423.

It is preferred that the polar groups of the vinyl chloride copolymers used in the second magnetic layer does not exceed suitable amounts. The suitable amount differs depending on the kind of the polar group. For the —OH group and the epoxy group which are relatively weak in polarity, an amount of $2 \times 10^{-3}$ to $5 \times 10^{31\ 5}$ eq per g of the vinyl chloride copolymer is preferable. For the —COOM group, an amount of $7 \times 10^{-4}$ to $1 \times 10^{-5}$ eq per g of the vinyl chloride copolymer is preferable. For the $—SO_3M$ group, the

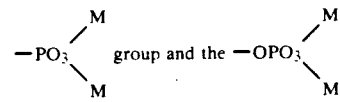

group which are the strongest in polarity, an amount of $2 \times 10^{-4}$ to $5 \times 10^{-6}$ eq per g of the vinyl chloride copolymer is preferable. If the amount of the polar groups exceeds the above ranges, the coated surface has a tendency to become rough, and if the amount is below the ranges, the dispersibility is deteriorated.

In the present invention, conventional thermoplastic resins, thermosetting resins, reactive resins and mixtures thereof used in combination can be used as the binders in either or both of the first and second magnetic layers.

As the thermoplastic resins, resins are used having a glass transition temperature of $-100$ to $150°$ C., an average number molecular weight of 1,000 to 200,000, preferably 10,000 to 100,000 and a degree of polymerization of about 50 to 1,000.

Examples of such resins include polymers and copolymers containing acrylic acid, an acrylate, vinylidene chloride, acrylonitrile, methacrylic acid, a methacrylate, styrene, butadiene, ethylene, vinyl butyral, vinyl acetal and vinyl ether as a structure unit; polyurethane resins; and various rubber type resins.

The thermosetting resins or the reactive resins include phenolic resins, phenoxy resins, epoxy resins, curable-type polyurethane resins, urea resins, melamine resins, alkyd resins, reactive acrylic resins, formaldehyde resins, silicone resins, epoxy-polyamide resins, mixtures of polyester resins and isocyanate prepolymers, mixtures of polyester polyols and polyisocyanates and mixtures of polyurethanes and polyisocyanates.

These resins are described in detail in *Plastic Handbook* published by Asakura Shoten, Japan.

It is also possible to use known resins of an electron beam hardening type for the first magnetic layer or the second magnetic layer. Examples of these resins and methods for producing them are described in detail in JP-A-62-256219.

As the polyurethane resins, conventional polyurethanes can be used such as polyesterpolyurethanes, polyetherpolyurethanes, polyetherpolyesterpolyurethanes, polycarbonatepolyurethanes, polyesterpolycarbonatepolyurethanes and polycaprolactonepolyurethanes.

For all of the binders described herein, in order to obtain more excellent dispersibility and durability, it is also possible to introduce therein at least one polar group selected from the group consisting of —COOM, —SO$_3$M, —OSO$_3$M, —P=O(OM)$_2$, —O—P=O(OM)$_2$ (in the formulae immediately above, M represents a hydrogen atom, an alkali metal or ammonium), —OH, an epoxy group, —SH and —CN, by copolymerization or addition reaction as needed The preferred amount of such a polar group is $1 \times 10^{-4}$ to $1 \times 10^6$ eq per g of the binder.

The binder used in the present invention is used in an amount of generally 5 to 50% by weight based on the ferromagnetic powder contained in each of the first and second magnetic layers, preferably 10 to 30% by weight. The vinyl chloride resin is preferably used in an amount of 5 to 30% by weight. Each of the polyurethane resin and the polyisocyanate resin is preferably used in an amount of 2 to 20% by weight in combination with the vinyl chloride resin.

When the polyurethane resins are used in the present invention, polyurethane resins are preferably used having a glass transition temperature of $-50°$ to $100°$ C., a breaking extension of 100 to 2,000%, a breaking stress of 0.05 to 10 kg/cm$^2$ and a yield point of 0.05 to 10 kg/cm$^2$.

As explained heretofore, the magnetic recording medium of the present invention comprises preferably two magnetic layers. It is possible within the scope of the present invention, of course, to vary many parameters between the first magnetic layer and the second magnetic layer such as in the amount of the binder, in the amount of the vinyl chloride resin, the polyurethane resin, the polyisocyanate resin or the other resins contained in the binder, in the molecular weight or the amount of the polar groups of each resin forming the magnetic layers, or in the physical characteristics of the above-described resins.

The polyisocyanates which can be used in the present invention include isocyanates such as tolylene diisocyanate, 4,4′-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates with polyalcohols; and polyisocyanates formed by condensation of isocyanates. These isocyanates are commercially available under the trade names of Coronate L, Coronate HL, Coronate 2030, Coronate 2031, Millionate MR and Millionate MTL (manufactured by Nippon Polyurethane Co., Ltd.); Takenate D-102, Takenate D-110N, Takenate 200 and Takenate D-202 (manufactured by Takeda Chemical Industries, Ltd.); and Desmodule L, Desmodule IL, Desmodule N and Desmodule HL (manufactured by Sumitomo Bayer Co., Ltd.). These polyisocyanates can be used alone or in combinations of two or more in either or both of the first and second magnetic layers, utilizing the difference in hardening reactivity.

The ferromagnetic powders which can be used in the first and second magnetic layers in the present invention include conventional ferromagnetic powders such as $\gamma$-FeO$_x$ (x=1.33 to 1.5), Co-modified $\gamma$-FeO$_x$ (x=1.33 to 1.5), a finely divided ferromagnetic alloy mainly containing at least 75% of Fe, Ni or Co, barium ferrite and strontium ferrite. These ferromagnetic powders may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B, in addition to the above mentioned atoms.

These ferromagnetic powders can be previously treated with dispersants, lubricating agents, surface active agents, antistatic agents or the like which will be described hereinafter, prior to their dispersion.

Of the above-described ferromagnetic powders, the finely divided ferromagnetic alloys may contain small amounts of hydroxides or oxides. The ferromagnetic powders as obtained by conventional methods can be used, which include the following methods:

(a) A method in which a complex organic acid salt (mainly an oxalic acid salt) is reduced with a reducing gas such as hydrogen.

(b) A method in which iron oxide is reduced with a reducing gas such as hydrogen to obtain Fe or Fe-Co particles.

(c) A method in which a metal carbonyl compound is thermally decomposed.

(d) A method in which a reducing agent such as sodium boronhydride, a hypophosphite or hydrazine is added to an aqueous solution of a ferromagnetic metal to conduct reduction.

(e) A method in which a metal is evaporated in a low-pressure inert gas to obtain a fine powder.

The finely divided ferromagnetic alloys thus obtained may be gradually oxidized by methods conventional in the art such as a method in which the ferromagnetic alloy is immersed in an organic solvent, followed by drying, or a method in which ferromagnetic alloy is immersed in an organic solvent and then an oxygen-containing gas is introduced therein, followed by drying, or a method in which the partial pressures of an oxygen gas and an inert gas are controlled to form oxide films on the surfaces of the particles, not using an organic solvent.

It is preferred that the ferromagnetic powder used in the present invention has few voids. The percentage of voids is preferably 20% by volume or less, more preferably 5% by volume or less.

The ferromagnetic powders used in the present invention can be produced by conventional methods. The shape thereof may be any of acicular, granular, ellipsoidal and plate-like shapes, as long as the above-described requirements for particle size are satisfied. It is preferred that the ferromagnetic powder of the first magnetic layer has a specific surface area of 45 m$^2$/g or less, which is measured by the BET method (S$_{BET}$), and a crystallite size of 290 Å or more, and that the ferromagnetic powder of the second magnetic layer has a specific surface area of 30 m$^2$/g or more, which is measured by the BET method (S$_{BET}$), and a crystallite size of 400 Å or less. It is further preferred that the difference in specific surface area (S$_{BET}$) between the ferromagnetic powders in the first and second magnetic layers is more than 5 m$^2$/g.

In the present invention, carbon black can be used. Examples thereof include furnace black for rubbers, thermal black for rubbers, black for coloring and acetylene black. It is preferred that the carbon black has a specific surface area (S$_{BET}$) of 5 to 500 m$^2$/g, an oil adsorption as measured by the DBP method of 10 to 400 ml/100 g, a particle size of 5 to 300 mμ, a pH of 2 to 10, a water content of 0.1 to 10% by weight and a tap density of 0.1 to 1 g/ml.

Specific examples of the carbon black used in the present invention include Blackpearls 2,000, 1,300, 1,000, 900, 800 and 700, and Vulcan XC-72 (manufactured by Cabot Co., Ltd.); #80, #60, #55, #50 and #35 (manufactured by Asahi Carbon Co., Ltd.); #2400B, #2300, #900, #1,000, #30, #40 and #10B (manufactured by Mitsubishi Chemical Corporation); and Conductex SC, Raven 150, 50, 40 and 15 (manufactured by Colombia Carbon. Co., Ltd.). Carbon black may be used which is surface treated with a dispersing agent, or which is grafted with a resin, or whose surface is partly graphitized. Further, the carbon black may be previously dispersed with a binder before its addition to a magnetic coating solution (or composition).

The carbon black acts so as to provide antistatic property to the magnetic layers, to reduce the coefficient of friction, to give shading property and to improve film strength. These functions vary depending on the carbon black used. It is possible, of course, that the carbon black is properly used in the first and second magnetic layers by changing the kind, amount and combination of the carbon black, based on various characteristics described above such as particle size, oil absorption, electric conductivity and pH, according to the purpose sought. For example, carbon black which is high in electric conductivity is incorporated in the first magnetic layer to prevent electric charge, and carbon black which is large in particle size is incorporated in the second layer to reduce the coefficient of friction.

The carbon black which can be used in the present invention can be referred to, for example, in the *Carbon Black Binran* edited by the Carbon Black Association.

It is preferred that the carbon black contained in the first magnetic layer has an average particle size of less than 20 mμ, and is contained in an amount of 1 to 20 parts by weight per 100 parts by weight of the ferromagnetic powder, and that the carbon black contained in the second magnetic layer has an average particle size of 40 to 80 mμ, and is contained in an amount of 0.1 to 10 parts by weight per 100 parts by weight of the ferromagnetic powder.

In the present invention, as the abrasive agents, conventional agents are mainly used which have a Mohs' hardness of at least 6, such as α-alumina having α-conversion ratio of 90% or more, β-alumina, silicon carbide, chromium oxide, cerium oxide, α-iron oxide, corundum, artificial diamond, silicon nitride, silicon carbide-titanium carbide, titanium oxide, silicon dioxide and boron nitride alone or in combinations thereof. Composite materials (obtained by surface treatment of abrasive agents with other abrasive agents) composed of these abrasive agents may also be used. In some cases, these abrasive agents contain compounds or elements other than the main components. However, the effect is unchanged as long as the main components are contained in an amount of 90% or more.

These abrasive agents are preferably 0.01 to 2 μm in particle size. However, the abrasive agents different in particle size may be combined with one another if desired, or the particle size distribution of a single abrasive agent may be broadened to obtain a similar effect. It is preferred that the abrasive agents have a tap density of 0.3 to 2 g/ml, a water content of 0.1 to 5%, a pH of 2 to 11 and a specific surface area ($S_{BET}$) of 1 to 30 m²/g.

The shape of the abrasive agents used in the present invention may be any of acicular, spherical and die-like shapes, but the shape having a corner is preferable because of its high abrasive ability.

Specific examples of the abrasive agents used in the present invention include AKP-20, AKP-30, AKP-50 and HIT-50 (manufactured by Sumitomo Chemical Co., Ltd.); G5, G7 and S-1 (manufactured by Nippon Chemical Industrial Co., Ltd.); and 100ED and 140ED (manufactured by Toda Kogyo Co., Ltd).

It is understood that it is possible that the abrasive agents are appropriately used in the first and second magnetic layers by changing the kind, amount and combination of the abrasive agents according to the purpose sought. For example, in order to improve the durability of the major surfaces of the magnetic layer structure, the amount of the abrasive agent contained in the second magnetic layer is increased, and in order to improve the durability of the edge surfaces of the magnetic layer structure, the amount of the abrasive agent contained in the first magnetic layer is increased. It is further preferred that the first magnetic layer contains the abrasive agent having a Mohs' hardness of less than 7 and the second magnetic layer contains the abrasive agent having a Mohs' hardness of 7 or more.

These abrasive agents can be previously dispersed with the binders, followed by addition to magnetic coatings.

It is preferred that the major surfaces and the edge surfaces of the magnetic layer structure of the magnetic recording medium of the present invention contain 5 particles/100 μm² or more of the abrasive agent.

In the present invention, additives having lubricating effect, antistatic effect, dispersing effect, plasticizing effect or the like can be used. Examples of such additives include molybdenum disulfide, tungsten disulfide, graphite, boron nitride, fluorinated graphite, silicone oil, silicones having polar groups, fatty acid-modified silicones, fluorine-containing silicones, fluorine-containing alcohols, fluorine-containing esters, polyolefins, polyglycols, alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and triesters of monobasic fatty acids having 10 to 24 carbon atoms (which may contain unsaturated bonds or may be branched) and one of monovalent, divalent, trivalent, tetravalent, pentavalent and hexavalent alcohols having 12 to 22 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms. Specific examples of these compounds include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol.

There can be also used nonionic surface active agents such as alkylene oxides, glycerin compounds, glycidol compounds and alkylphenol-ethylene oxide adducts; cationic surface active agents such as cyclic amines, ester amides, quaternary ammonium salts, hydantoin derivatives, heterocyclic compounds, phosphonium compounds and sulfonium compounds; anionic surface active agents containing acidic groups such as carboxyl groups, sulfonic acid groups, phosphoric acid groups, sulfate groups and phosphate groups; and amphoteric surface active agents such as amino acids, aminosulfonic acids, sulfates or phosphates of aminoalcohols and alkylbetaine-type compounds. These surface active agents are described in detail in *Surface Active Agents Binran* published by Sangyo Tosho Co., Ltd., Japan.

These lubricating agents and antistatic agents do not necessarily have to possess a purity of 100%, and may contain impurities such as isomers, unreacted materials, by-products, decomposed products and oxidation products other than the main components. The amount of these impurities contained in the lubricating agents and antistatic agents is preferably 30% or less, more preferably 10% or less.

It is possible that these lubricating agents and surface active agents are properly used in the first and second magnetic layers by changing the kind and amount thereof if desired. For example, the following agents or additives are applicable in this regard.

(1) Fatty acids different in melting point are used in the first and second magnetic layers, respectively, to control their bleeding to the surface.

(2) Esters different in boiling point or in polarity are used in the first and second magnetic layers, respectively, to control their bleeding to the surface.

(3) The amount of the surface active agent is adjusted to improve the stability of coating.

(4) The amount of the lubricating agent to the ferromagnetic powder is increased in the first magnetic layer to improve lubricating effect.

The use of the lubricating agents and the surface active agents is of course not limited to the examples shown here.

All or a part of the additives used in the present invention can be added in any step of the ferromagnetic coating production. For example, they can be mixed with the ferromagnetic powder before a kneading step, or can be added during the kneading step of the ferromagnetic powder, the binder and the solvent, during a dispersing step, after the dispersing step, or just before a coating step.

Examples of commercial products of these lubricating agents include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor oil hardened fatty acids, NAA-42, NAA-44, Cation SA, cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion TO-221, Monogly MB, Nonion DS-60, Anon BF, Anon LG, Butyl stearate, butyl laurate and erucic acid (manufactured by Nippon Oil and Fats Co., Ltd.); Oleic acid (manufactured by Kanto Kagaku Co., Ltd.); FAL-205 and FAL-123 (manufactured by Takemoto Yushi Co., Ltd.); Enujerubu LO, Enujerube IPM and Sansosyzer-E4030 (manufactured by Shin Nippon Rika Co., Ltd.); TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 (manufactured by Shinetsu Chemical Co., Ltd.); Armide P, Armide C and Armoslip CP (manufactured by Lion Ahmer Co.); Duomine TDO (manufactured by Lion Fat and Oil Co., Ltd.); BA-41G (manufactured by Nisshin Seiyu Co., Ltd.]; and Profan 2012E, Newpole PE61, Ionet MS-400, Ionet MO-200, Ionet DL-200, Ionet DS-300, Ionet DS-1000 and Ionet DO-200 (manufactured by Sanyo Chemical Industries, Ltd.).

It is preferred that the amount of the lubricating agent contained in the second magnetic layer is larger than that contained in the first magnetic layer.

Examples of organic solvents used in the present invention include ketones such as acetone, methyl ethyl ketone, methyl isobutyl ketone, diisobutyl ketone, isophorone, cyclohexanone and tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane. These solvents may be used in any appropriate proportions.

These organic solvents do not necessarily have a purity of 100%, and may contain impurities such as isomers, unreacted materials, by-products, decomposed products, oxidation products and water other than the main components. The amount of these impurities contained in the solvents is preferably 30% by weight or less, more preferably 10% by weight or less.

The organic solvent used in the first magnetic layer may be different from that used in the second magnetic layer in kind and amount thereof. For example, the highly volatile solvent is used in the first magnetic layer to improve surface properties, the solvent having high surface tension (such as cyclohexane or dioxane) is used in the first magnetic layer to improve coating stability, or the solvent having a high solubility parameter is used in the second magnetic layer to increase the packing density. The use of the solvents is of course not limited to these examples.

In the magnetic recording medium of the present invention, the thickness of the non-magnetic support is generally 1 to 100 μm, preferably 6 to 20 μm, the thickness of the first magnetic layer is generally 1.0 to 10 μm, preferably 1.5 to 5 μm, and the thickness of the second magnetic layer is generally not more than 4.0 μm, particularly preferably not more than 3.5 μm. The thickness of the magnetic layer structure is in the range of one hundredth to 2 times that of the non-magnetic support. Between the non-magnetic support and the first magnetic layer may be formed an interlayer such as an undercoating layer for improvement in adhesion or a layer containing carbon black for prevention of electric charge. The thickness of the interlayer is generally 0.01 to 2 μm, preferably 0.05 to 0.5 μm. A backing layer may be provided on the opposite surface of the magnetic layer. The thickness of the backing layer is generally 0.1 to 2 μm, preferably 0.3 to 1.0 μm. As the interlayer and the backing layer, conventional materials are used.

The non-magnetic supports used in the present invention include conventional films formed of polyesters such as polyethylene terephthalate and polyethylene naphthalate), polyolefins, cellulose triacetate, polycarbonates, polyamides, polyimides, polyamideimides or polysulfones. These supports may previously be subjected to corona discharge treatment, plasma treatment, adhesion treatment, heating treatment, dust removing treatment or the like. In order to attain the object of the present invention, a non-magnetic support is used having a center line average surface roughness (Ra) (cut off value: 0.25 mm) of generally not more than 0.03 μm, preferably not more than 0.02 μm, more preferably not more than 0.01 μm.

It is further preferable that the non-magnetic support is not only low in center line average surface roughness, but also has no coarse projections of 1 μm or more. The roughness and shape of the surface of the support are controlled by adjusting the size and amount of a filler added thereto if desired. Examples of the fillers include finely divided organic substances such as acrylic compounds, in addition to oxides and carbonates of Ca, Si, Ti and the like. As to the non-magnetic support used in the present invention, the F-5 (i.e., the load at the 5% elongation) value in the running direction of the tape is preferably 5 to 50 kg/mm$^2$, and the F-5 value in the width direction of the tape is preferably 3 to 30 kg/mm$^2$. In general, the F-5 value in the running direction of the tape is generally higher than that in the width direction of the tape. When the strength in the width direction of the tape is particularly required to be increased, however, this arrangement does not apply.

Further, the heat shrinkage rate in the running and width directions of the tape at 100° C. for 30 minutes is preferably 3% or less, more preferably 1.5% or less, and the heat shrinkage rate at 80° C. for 30 minutes is preferably 1% or less, more preferably 0.5% or less.

The breaking strength in both directions of the tape is preferably 5 to 100 kg/mm$^2$, and the modulus is preferably 100 to 2,000 kg/mm$^2$.

The production process of the magnetic coating used for the magnetic recording medium of the present invention comprises at least a kneading step, a dispersing step and mixing steps added before and/or after these steps if desired. Each step can be divided into two or more stages.

All of the starting materials used in the present invention, such as the ferromagnetic powders, the binders, the carbon black, the abrasive agents, the antistatic agents, the lubricating agents and the solvents, can be added at the start of or during any step. Each of the starting materials can also be added in parts over two or more steps. For example, polyurethane can be incorporated in parts in the kneading step, in the dispersing step and in the mixing step for adjustment of viscosity after the dispersing step.

In order to attain the objects of the present invention, it is understood that production techniques conventional in the art can be used as a part of the process. In the kneading step, however, it is preferable to use kneaders having strong kneading ability such as continuous kneaders and pressure kneaders.

When the continuous kneader or the pressure kneader is used, all of the binders or a part thereof (30% or more of all of the binders is preferable) are kneaded with the ferromagnetic powder within the range of 15 to 500 parts by weight per 100 parts by weight of the ferromagnetic powder. The details of such kneading treatment are described in JP-A-1-106338 and JP-A-64-79274. In the magnetic recording medium of the present invention, the thickness of the second magnetic layer is particularly preferably 3.5 μm or less. It is however especially difficult to obtain such a thickness by the conventional successive plural coating method in which the first magnetic layer is applied and then the second magnetic layer is applied thereon after drying, because of production of coating defects. In the present invention, the second magnetic layer having particularly preferably a thickness of 3.5 μm or less can first be obtained by using the simultaneous or successive wet-on-wet plural coating method as described in JP-A-62-212933.

The first magnetic layer constitutes a lower layer in the magnetic recording medium, and is not directly contacted with the magnetic head since the second magnetic layer intervenes between the first magnetic layer and the magnetic head. That is, the first magnetic layer is therefore not brought into direct contact with the magnetic head.

For this reason, it is not necessary to take into account the head touch and short wavelength recording components called in question in video tapes, and the improvements can be directed toward the high filling property and high magnetic characteristics. As a result, it is possible to improve audio characteristics.

The amine-modified vinyl chloride copolymers used in the present invention have high dispersibility for the ferromagnetic powders, so that it is possible to increase the filling degree of the ferromagnetic powders in the magnetic layers and improve the audio characteristics. However, at the same time, the magnetic layers become hard, and therefore the satisfactory head touch can not be obtained in many instances.

In the instances of a video tape comprising a single layer magnetic layer structure, this problem is solved by the hardness or the composition ratio of a second component contained in the binder, or by the addition of a plasticizer. In many cases, however, problems occur in this instance with respect to running durability and stability with time elapsing.

The inclusion of many hydrophilic functional groups reduces the solubility in organic solvents, which frequently causes the surface of the coated film to roughen in the course of drying of the coated film.

In this respect, in the case of a video tape comprising the plural layer magnetic layer, the first magnetic layer (i.e., the lower magnetic layer) does not come into direct contact with a video head. Hence, there is no fear that the head touch becomes imperfect, and the running durability and the stability with time elapsing are not deteriorated. Thus, the satisfactory audio characteristics can be obtained by the high filling of the ferromagnetic powder. The countermeasure to the roughened surface which is liable to occur in the course of drying of the coated film can be taken by controlling the solubility of the second magnetic layer.

It is therefore possible to raise the filling density and to improve the audio characteristics by adding the amine-modified vinyl chloride copolymer to the first magnetic layer. Further, the second magnetic layer (i.e., the upper magnetic layer) which comes into direct contact with the magnetic head contains the binder mainly composed of the prior-art vinyl chloride resin properly containing at least one group selected from the group consisting of —OH, an epoxy group, —COOM, —SO$_3$M.

(wherein M represents hydrogen, an alkali metal or ammonium), whereby the satisfactory head touch can be obtained.

The above-described vinyl chloride resins used for the second magnetic layer have suitable solubilities to the solvents so that the roughened surface which occurs in the course of drying of the coated film can be prevented. This also contributes to an improvement in electromagnetic conversion characteristics.

The present invention will be described in more detail with reference to the following Samples and Comparative Samples, in which all parts are by weight.

EXAMPLE

Magnetic coating solutions having the following compositions were prepared:

| Coating solution for First Magnetic Layer | |
|---|---|
| Co-γ-Fe$_2$O$_3$(Hc: 650 Oe, specific surface area measured by the BET method: 30 m$^2$/g, tap density: 0.82) | 100 parts |
| Vinyl chloride copolymer (composition is shown in Table 1) | 11 parts |
| Polyester polyurethane resin (Crisvon 7209 manufactured by Dainippon Ink and Chemicals Inc.) | 6 parts |
| Coronate L | 3 parts |
| Carbon black (average particle size: 18 mμ) | 10 parts |
| α-Fe$_2$O$_3$ (average particle size: 0.5 μm) | 10 parts |
| Butyl stearate | 1 part |
| Stearic acid | 1 part |
| Butyl acetate | 200 parts |
| Cyclohexanone | 20 parts |
| Coating Solution for Second Magnetic Layer | |
| Co-γ-Fe$_2$O$_3$ (Hc: 700 Oe, specific surface area measured by the BET method: 40 m$^2$/g) | 100 parts |
| Vinyl chloride copolymer (composition is shown in Table 1) | 11 parts |
| Polyester polyurethane resin (containing carboxyl groups, TI-3091, manufactured by Sanyo Chemical Industries, Ltd.) | 8 parts |
| Coronate L | 3 parts |
| Carbon black (average particle size: 80 mμ) | 5 parts |
| α-Fe$_2$O$_3$ (average particle size: 0.3 μm) | 8 parts |
| Butyl stearate | 1.5 parts |
| Stearic acid | 3 parts |
| Butyl acetate | 200 parts |
| Methyl ethyl ketone | 60 parts |

With respect to each of the two coatings described above, the components were kneaded with an open kneader (manufactured by Moriyama Seisakusho), and then dispersed by using a sand grinder. 6 parts of a polyisocyanate and 40 parts of butyl acetate were added to the resulting dispersion solution, followed by filtration using a filter having an average pore size of 1 μm to prepare a coating solution for each of the first and second magnetic layers.

The resulting coating solution for the first magnetic layer was applied to the surface of a 15 μm-thick polyethylene terephthalate support, while allowing the support to run at a speed of 60 m/min, by using reverse rolls so as to form a first magnetic layer having a dry thickness of 3.0 μm after drying. Then, the coating solution for the second magnetic layer was applied on the first magnetic layer by using the reverse rolls so as to form a second magnetic layer having a dry thickness of 1.0 μm. Orientation was thereafter conducted by a magnet while the first and second magnetic layer were under the wet condition. After drying, super calender treatment was conducted, followed by slitting to a width of ½ inch to produce a video tape.

In the sample of No. 10, the coating solution for the first magnetic layer was not coated, and the coating solution for the second magnetic layer was directly coated so as to form a magnetic layer having a thickness of 4.0 μm, followed by treatment in the same manner as described above.

The resulting video tapes were evaluated by the following measuring methods. The results are shown in Table 2.

Measuring Methods (1) Video Output

Using a VTR ("AG-6800", manufactured by Matsushita Electric Industrial Co., Ltd.), the video output to a standard tape ("Super AG T-120", manufactured by Fuji Photo Film Co., Ltd.) was measured.

(2) Audio Output

A sine-wave signal which is 1 kHz in a specified input level was recorded at a specified bias. The level of a reproduced output thereof was measured with a level meter. The difference between the measured value and a specified output level was expressed in dB.

(3) Saturation Magnetic Flux Density of First Magnetic Layer Bm and Second Magnetic Layer Bm'

After each of the coating solutions for the first and second magnetic layers was independently applied, followed by calender treatment, the saturation magnetic flux density was determined at an Hm of 5 kOe, using a vibrating-sample type magnetometer (manufactured by Toei Kogyo Co., Ltd.).

TABLE 1

| | Average Degree of Polymerization | Composition | Vinyl Chloride Copolymer Polar Group | Amount of Polar Group (eq/g)* |
|---|---|---|---|---|
| A | 360 | Vinyl chloride/vinyl acetate/vinyl alcohol/amine-modified vinyl = 92/3/4.4/0.6 (wt %) | —N$^+$(CH$_3$)$_3$Cl$^-$<br>—OH | 5 × 10$^{-5}$<br>100 × 10$^{-5}$ |
| B | 330 | Vinyl chloride/vinyl propionate/glycidyl acrylate/amine-modified vinyl = 85.2/5/9/0.8 (wt %) | —N(C$_2$H$_5$)$_2$<br>Epoxy group | 5 × 10$^{-5}$<br>70 × 10$^{-5}$ |

TABLE 1-continued

Vinyl Chloride Copolymer

| | Average Degree of Polymerization | Composition | Polar Group | Amount of Polar Group (eq/g)* |
|---|---|---|---|---|
| C | 350 | Vinyl chloride/n-butyl acrylate/amine-modified vinyl = 90/9.3/0.7 (wt %) | $-N(CH_3)_2$ | $5 \times 10^{-5}$ |
| D | 400 | Vinyl chloride/vinyl acetate/vinyl alcohol/amine-modified vinyl = 92.5/3/4.4/0.1 (wt %) | $-N^+(CH_3)_3Cl^-$<br>$-OH$ | $5 \times 10^{-6}$<br>$100 \times 10^{-5}$ |
| E | 300 | Vinyl chloride/n-butyl acrylate/3-hydroxypropylacryl ether/amine-modified vinyl = 80.2/8/5.8/6 (wt %) | $-N^+(CH_3)_3Cl^-$<br>$-OH$ | $5 \times 10^{-4}$<br>$50 \times 10^{-5}$ |
| F | 380 | Vinyl chloride/vinyl acetate/vinyl alcohol = 92.6/3/4.4 (wt %) | $-OH$ | $120 \times 10^{-5}$ |
| G | 360 | Vinyl chloride/vinyl acetate/maleic acid = 89.2/5/5.8 (wt %) | $-COOH$ | $50 \times 10^{-5}$ |
| H | 300 | Vinyl chloride/glycidyl acrylate/$-SO_3K-$containing vinyl = 90.9/1 (wt %) | $-SO_3K$<br>Epoxy group | $5 \times 10^{-5}$<br>$70 \times 10^{-5}$ |
| I | 360 | Vinyl chloride/vinyl acetate/$-OPO(OH)_2-$ = containing vinyl/vinyl alcohol = 94.4/4/1/0.6 (wt %) | $-OPO(OH)_2$<br>$-OH$ | $5 \times 10^{-5}$<br>$100 \times 10^{-5}$ |

*eq/g: equivalent per 1 g of the copolymer

TABLE 2

| | First Magnetic Layer | | | Second Magnetic Layer | | | First Magnetic Layer Bm (gauss) | Second Magnetic Layer Bm (gauss) | Video Output (dB) | Audio Output (dB) |
|---|---|---|---|---|---|---|---|---|---|---|
| Sample No. | Vinyl Chloride Resin | Kind of Polar Group | Amount of Polar Group (eq/g)* | Vinyl Chloride Resin | Kind of Polar Group | Amount of Polar Group (eq/g) | | | | |
| 1 | A | $-N^+(CH_3)_3Cl^-$ | $5 \times 10^{-5}$ | F | $-OH$ | $120 \times 10^{-5}$ | 2030 | 2180 | +0.8 | +0.7 |
| 2 | B | $-N(C_2H_5)_2$ | $5 \times 10^{-5}$ | F | $-OH$ | $120 \times 10^{-5}$ | 2100 | 2180 | +0.9 | +0.8 |
| 3 | C | $-N(CH_3)_2$ | $5 \times 10^{-5}$ | F | $-OH$ | $120 \times 10^{-5}$ | 2090 | 2180 | +0.8 | +0.7 |
| 4 | D | $-N^+(CH_3)_3Cl^-$ | $5 \times 10^{-6}$ | F | $-OH$ | $120 \times 10^{-5}$ | 2080 | 2180 | +0.8 | +0.7 |
| 5 | E | $-N^+(CH_3)_3Cl^-$ | $5 \times 10^{-4}$ | F | $-OH$ | $120 \times 10^{-5}$ | 2070 | 2180 | +0.9 | +0.7 |
| 6 | A | $-N^+(CH_3)_3Cl^-$ | $5 \times 10^{-5}$ | G | $-COOH$ | $50 \times 10^{-5}$ | 2050 | 2180 | +1.0 | +0.6 |
| 7 | A | $-N^+(CH_3)_3Cl^-$ | $5 \times 10^{-5}$ | H | $-SO_3K$ | $5 \times 10^{-5}$ | 2050 | 2190 | +1.1 | +0.6 |
| 8 | A | $-N^+(CH_3)_3Cl^-$ | $5 \times 10^{-5}$ | I | $-OPO(OH)_2$ | $5 \times 10^{-5}$ | 2050 | 2200 | +0.9 | +0.6 |
| 9 | G | $-COOH$ | $5 \times 10^{-5}$ | G | $-COOH$ | $50 \times 10^{-5}$ | 1800 | 2180 | -0.2 | -0.7 |
| 10 | Single Layer | | | A | $-N^+(CH_3)_3Cl^-$ | $5 \times 10^{-5}$ | — | 2320 | ±0 | ±0 |

*eq/g: equivalent per 1 g of the resin

As is apparent form the results shown in Table 2, the samples of Nos. 1 to 8 in which the amine-modified vinyl chloride copolymers having the specified polar groups according to the present invention are used in the first magnetic layers are significantly improved in video output and audio output.

On the other hand, when the amine-modified vinyl chloride copolymer is not used in the first magnetic layer, the video output and the audio output both are low (See Sample No. 9).

Even though the amine-modified vinyl chloride copolymer is used, the single layer magnetic layer does not give the improving effects of the present invention in both video output and audio output (See Sample No. 10).

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon at least a first magnetic layer and a second magnetic layer, containing ferromagnetic particles dispersed in a binder, in that sequence, wherein said first magnetic layer contains an amine-modified vinyl chloride copolymer as the binder and wherein said amine-modified vinyl chloride copolymer contains an amine or an ammonium salt in an amount of $5 \times 10^{-6}$ to $1 \times 10^{-3}$ eq per 1 g of the copolymer, and wherein said second magnetic layer contains as the binder a vinyl chloride copolymer having at least one polar group selected from the group consisting of $-OH$, an epoxy group, $-COOM$, $-SO_3M$, $-OSO_3M$,

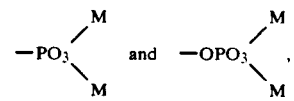

wherein M represents hydrogen, an alkali metal or ammonium and wherein said second magnetic layer does not contain an amine-modified vinyl chloride copolymer.

2. The magnetic recording medium as in claim 1, wherein said second magnetic layer is applied while the previously applied first magnetic layer is in a wet state.

3. The magnetic recording medium as in claim 1, wherein said first magnetic layer contains ferromagnetic powder having a specific surface area of 45 m²/g or less and a crystallite size of 290 Å or more, and said second magnetic layer contains ferromagnetic powder having a specific surface area of 30 m²/g or more and a crystallite size of 400 Å or less.

4. The magnetic recording medium as in claim 3, wherein the specific surface area of the ferromagnetic powder in the second magnetic layer is greater by more than 5 m²/g than the specific surface area of the ferromagnetic powder in the first magnetic layer.

5. The magnetic recording medium as in claim 1, wherein said first magnetic layer also contains polyurethane and polyisocyanate compounds in addition to the amine-modified vinyl chloride copolymer.

6. The magnetic recording medium as in claim 1, wherein said binder is used in an amount of from 5 to 50% by weight based on the weight of the ferromagnetic particles.

7. The magnetic recording medium as in claim 1, wherein said amine-modified vinyl chloride copolymer contains 0.5 to 30% by weight of a vinyl alkyl carboxylate and/or an acrylate comonomer.

8. The magnetic recording medium as in claim 1, wherein said amine-modified vinyl chloride copolymer contains —OH groups and/or epoxy groups in amount of $5 \times 10^{-5}$ to $2 \times 10^{-3}$ eq per 1 g of the copolymer.

9. The magnetic recording medium as in claim 1, wherein said first magnetic layer contains carbon black having an average particle size of less than 20 mµ and is contained in an amount of 1 to 20 parts by weight per 100 parts by weight of the ferromagnetic particles and said second magnetic layer contains carbon black having an average particle size of 40 to 80 mµ and is contained in an amount of 0.1 to 10 parts by weight per 100 parts by weight of the ferromagnetic particles.

10. The magnetic recording medium as in claim 1, wherein said first magnetic layer has a thickness of 1.5 to 5.0 µm and said second magnetic layer has a thickness of 3.5 µm or less.

11. The magnetic recording medium as in claim 1, wherein said first magnetic layer contains an abrasivee agent having a Mohs' hardness of less than 7 and the second magnetic layer contains an abrasive agent having a Mohs' hardness of 7 or more.

12. The magnetic recording medium as in claim 1, wherein said ferromagnetic particles contained in said second magnetic layer have an coercive force (Hc) of 1,000 Oe or more and the ferromagnetic powder contained in said first magnetic layer has an coercive force (Hc) of 600 Oe or more.

13. The magnetic recording medium as in claim 1, wherein the ferromagnetic particles in said first magnetic layer and said second magnetic layer comprise ferromagnetic powders which are cobalt-modified gamma-FeOx wherein x=1.33 to 1.5.

14. The magnetic recording medium as in claim 1, wherein said second magnetic layer contains a larger amount of lubricating agent than that contained in said first magnetic layer.

15. The magnetic recording medium as in claim 1, wherein said second magnetic layer contains a polyisocyanate compound, but said first magnetic layer contains no polyisocyanate compound.

* * * * *